United States Patent [19] [11] 4,373,815
Bruce [45] Feb. 15, 1983

[54] METHOD AND APPARATUS FOR MEASURING LEAKS IN LIQUID STORAGE VESSELS

[75] Inventor: Charles R. Bruce, Littleton, Colo.

[73] Assignee: Marathon Oil Company, Findlay, Ohio

[21] Appl. No.: 222,806

[22] Filed: Jan. 5, 1981

[51] Int. Cl.³ .............................................. G01B 11/02
[52] U.S. Cl. ................................................... 356/358
[58] Field of Search ................ 356/357, 358; 340/619

[56] References Cited

U.S. PATENT DOCUMENTS 3,511,572  5/1970  Peabe et al. ......................... 356/358

FOREIGN PATENT DOCUMENTS 1773346  2/1973  Fed. Rep. of Germany ...... 356/358

OTHER PUBLICATIONS

Harrison et al., "A New Interferometric Manometer", *Metrologia*, vol. 12, No. 3, pp. 115-120, 1976.

*Primary Examiner*—John K. Corbin
*Assistant Examiner*—Matthew W. Koren
*Attorney, Agent, or Firm*—Jack L. Hummel

[57] ABSTRACT

A method and apparatus for detecting and measuring leaks in liquid storage vessels, such as underground gasoline storage tanks. A laser source beam is divided into second and third beams which are reflected normally off of a reference surface and the liquid surface, respectively, in the storage vessel. The reflected beams are recombined and the recombined beam is analyzed over time to detect fringes and thereby measure changes in the liquid surface level in the storage vessel.

10 Claims, 3 Drawing Figures

METHOD AND APPARATUS FOR MEASURING LEAKS IN LIQUID STORAGE VESSELS

BACKGROUND OF THE INVENTION

1. Field of the Invention:

This invention relates to methods and apparatus for detecting leaks in liquid storage vessels. More particularly, this invention relates to a method and apparatus for measuring changes in the level of a liquid surface in a storage vessel by splitting a laser beam, reflecting the split beams off of a reference surface and the liquid surface, recombining the reflected beams and analyzing the recombined beam to detect changes in the beam's fringe patterns.

2. Description of the Prior Art:

The detection of leaks in liquid storage vessels is a significant problem, particularly when the storage vessels are buried underground. Buried steel tanks are commonly used to store gasoline and chemicals. When these tanks come into contact with the soil, electrolytically enhanced corrosion may occur resulting in the formation of pin hole size holes, larger leakage holes, and/or seapage areas in the tanks. In addition, these and other types of storage vessels can suffer from weld splits, cracks, fractures, etc., all of which may contribute to leakage either out of or into the storage vessel. Liquid loses from storage tanks are not only economically undesireable, but may result in substantial damage to the environment, particularly when the stored liquid is a petroleum product or potentially toxic chemical. Leakages on the order of 0.05 gallons per hour are frequently of concern. In a storage vessel having a capacity on the order of 8,000 gallons, however, a leakage rate of 0.05 gallons per hour may result in a liquid level drop on the order of only about 0.001 inches per hour, depending on the tank geometry and liquid level. Therefor, high resolution measuring techniques are needed to adequately measure storage vessel leakage rates of this order of magnitude.

One prior method used to estimate leakage losses from underground gasoline storage tanks employs a stand pipe fixed to the tank fill hole. The storage tank and the stand pipe are filled with gasoline and then the amount of additional gasoline required to maintain the gasoline at a predetermined level in the stand pipe is measured over a relatively long period of time, usually on the order of about eight hours. The time required to use this method makes leakage measurement an inconvenient and costly process.

Other prior methods have employed the use of a manometer to estimate leakage loss rates. These methods, however, lack the resolution required to accurately measure relatively small leakage losses in large storage vessels.

It is one object of the invention to provide a high resolution leakage rate detection method and apparatus capable of detecting and measuring leakage rates in large storage vessels on the order of 0.05 gallons per hour.

It is a further object of the invention to provide a method and apparatus for detecting and measuring leakage rates from storage vessels in a relatively short period of time, such as one hour or less.

It is a further object of the invention to provide a method and apparatus for measuring leakage rates from storage vessels which are not dependent upon the liquid level in the storage vessel and which does not require filling of the storage vessel prior to measurement of leakage rates.

SUMMARY

These and other objects are obtained by the method and apparatus of the invention wherein a laser monochromatic electromagnetic beam is split into second and third beams which are reflected normally off of a reference reflector surface and the liquid surface in the vessel, respectively. The reflected beams are then recombined and analyzed to detect and measure changes in the recombined beam's fringe pattern which are representative of changes in the relative position of the reference reflector surface and the liquid surface.

The apparatus of the invention comprises a base adapted to rest on the bottom of the vessel, support means mounted on the base, an interferometer apparatus mounted on the support means a relatively short distance above the liquid level in the vessel, detector means for detecting changes in an interference pattern generated by the interferometer apparatus, and means for dampening surface waves in the liquid in the vessel. The apparatus is perferably further provided with a plurality of temperature sensors spaced along the support means, from which a temperature profile of the liquid in the vessel can be generated. Temperature related volume changes in the liquid can then be compensated for in the measurement of leakage rates with the interferometer apparatus.

DESCRIPTION OF THE PREFERRED EMBODIMENTS

Figure 1:
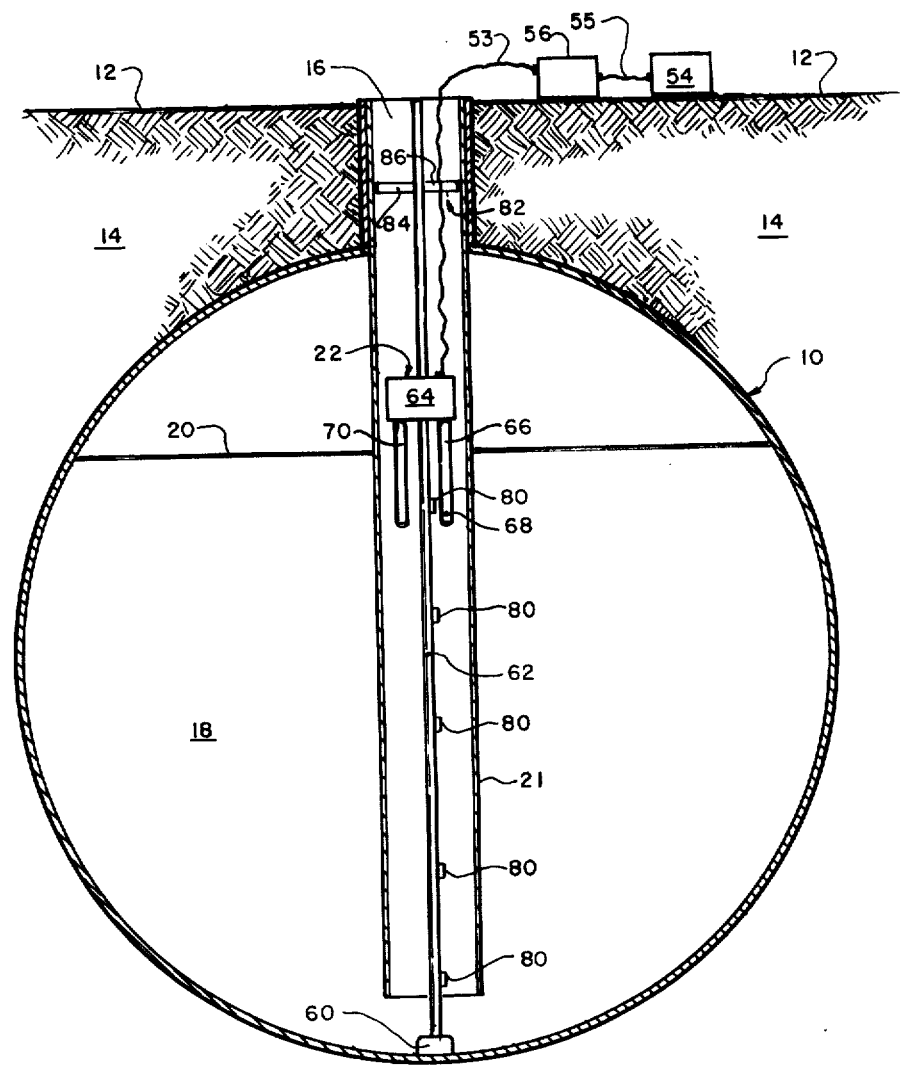
FIG. 1 is a side elevational view, partially in cross-section, showing the apparatus of the invention as used in connection with an underground liquid storage vessel.

Referring now to the drawings, and with particular reference to FIG. 1, the apparatus of the invention is illustrated as used in connection with a liquid storage vessel 10, such as a gasoline storage tank or the like, which is buried beneath the surface 12 of the ground 14. Storage vessel 10 is provided with an upper access opening 16 which is accessable from the surface 12 of the ground and is shown as containing a liquid 18, such as gasoline, having an upper liquid surface level 20. The illustrative storage vessel of FIG. 1 is shown as being further provided with a fill tube 21, having a diameter typically on the order of about 4 inches, as is common in the industry, particularly with respect to underground gasoline storage tanks.

In order to detect and measure the magnitude of leaks in the liquid storage vessel, interferometer apparatus, generally shown at 22 and similar in nature to the arrangement of a Michelson interferometer, is mounted in the fill tube 21 a relatively short distance above the upper liquid surface 20 of the liquid in the storage vessel to detect and measure changes in vertical position of the liquid surface level. The measured changes in the surface level are then correlated with known values of vessel size and geometry, and liquid content in the vessel, to determine the magnitude of liquid leaks out of or into the storage vessel.

Figure 2:
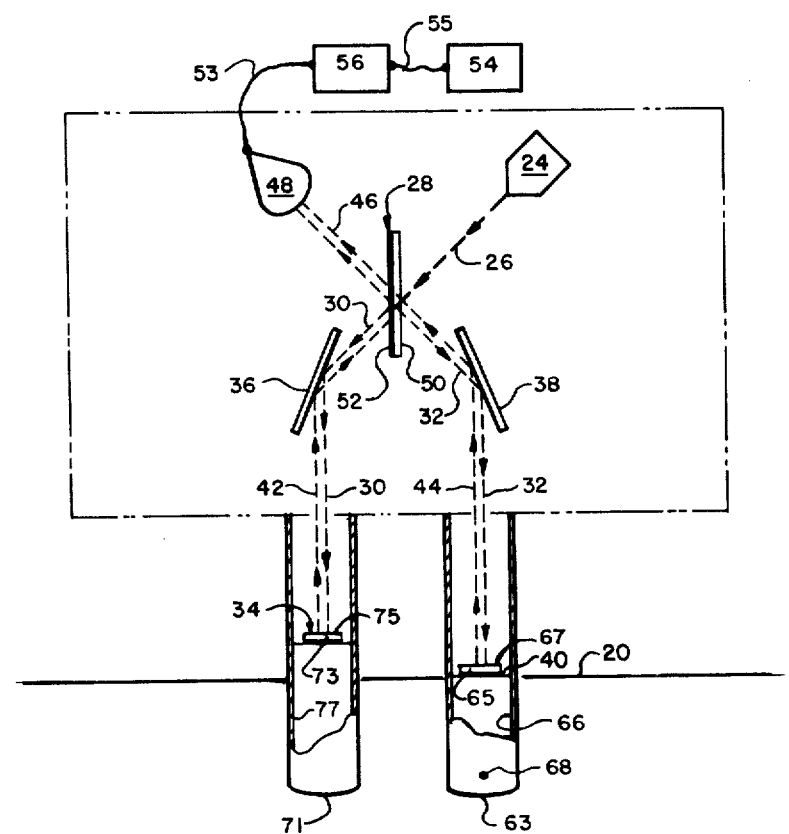
FIG. 2 is a schematic drawing showing a portion of the apparatus of FIG. 1 in use.

Referring now to FIG. 2, the interferometer apparatus of the invention is shown to generally comprise laser means, such as laser 24, for supplying a first beam 26 of electromagnetic radiation; beam splitter means, such as beam splitter 28, for splitting the first beam 26 into a second beam 30 and a third beam 32 of electromagnetic radiation; reference reflector means, such as reflector or mirror 34, adapted to be oriented in the storage vessel parallel to the liquid surface 20; beam director means, such as beam directors or mirrors 36, 38, for directing the second and third beams normally onto the reference reflector means 34 and onto a reflecting portion 40 of the upper liquid surface 20, respectively, and for directing beams, generally shown at 42, 44 reflected from the reference reflector means and the reflecting portion of the upper liquid surface into coincidence to form a recombined fourth beam of electromagnetic radiation 46; and detector means, such as fringe detector 48, for detecting changes in the interference or fringe patterns in the recombined fourth beam 46.

Since measurement according to the present invention depends on the interference of recombined beams having an identical wavelength, the laser means 24 is adapted to provide a monochromatic beam 26 of known wavelength. Various types of lasers generally available at the present time may be employed for this purpose. In order to avoid thermal expansion of the liquid in the storage vessel and particularly in applications where the stored liquid is flammable, such as with gasoline, it is preferable to employ a laser having a low intensity output in order to avoid ignition of the flammable material. A solid state laser having a relatively low average energy output and generating a wave length of, for example, 0.9 micrometers is particularly suitable for this purpose.

The beam splitter 28 is placed in the path of the first beam 26 of monochromatic electromagnetic energy in order to split the first beam into second and third beams 30, 32 of approximately equal intensity. As shown in the embodiment of FIG. 2, beam splitter 28 comprises a sheet of glass 50 having a partially silvered or "half-silvered" surface 52 on the side of the glass opposite the laser 24. In this manner, as the first beam 26 impinges upon the partially silvered surface 52, a portion of the beam 26 is transmitted through the surface 52 to form the second beam 30, and a separate portion of the beam 26 is reflected by the surface 52 to form a third beam 32. Alternatively, beam splitter 28 may comprise a conventional pellicle, as is known in the art. The beams 30, 32 have a wavelength identical to that of the first beam 26 as generated by laser 24.

As further shown in FIG. 2, beam directors or mirrors 36, 38 are placed in the paths of the second and third beams 30, 32, respectively. The beam director 36 is oriented so as to direct beam 30 to normally impinge upon the reference reflector means 34 and to direct the beam 42 reflected from the reference reflector means to the partially silvered surface 52 of the beam splitter 28. In a similar manner, the beam director 38 is oriented to direct the path of the third beam 32 to normally impinge upon the reflecting portion 40 of the upper liquid surface 20 to be measured, and to direct the beam 44 reflected from the liquid surface to be measured to the partially silvered surface 52 of the beam splitter 28 where it is combined with the beam 42 to form recombined beam 46.

The fringe pattern detector 48 is placed in the path of beam 46 where it detects the number of fringe cycles in the beam 46 as a function of time, as is hereinafter further described. Suitable detectors for performing this function are well known in the art.

Figure 3:
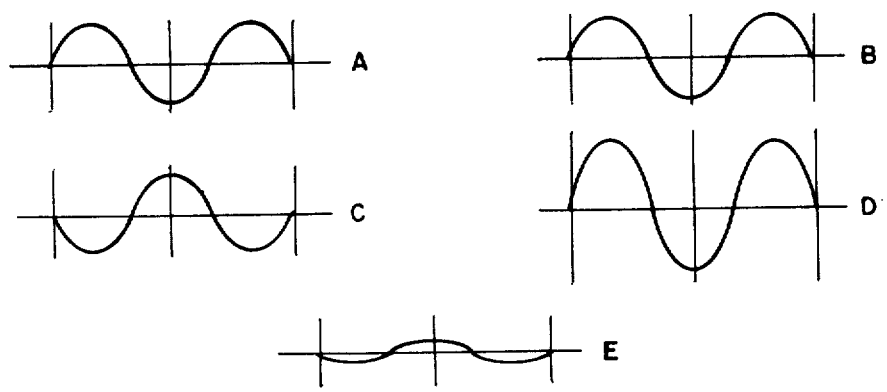
FIG. 3 is a schematic drawing showing illustrative relative phase relationships of illustrative components of the recombined beam in the practice of the invention.

The recombined beam 46 is comprised of the separate second and third beams 30/42 and 32/44 of identical wave length. However, because the beams 30/42 and 32/44 have traveled different pathways the component waves of the beam 44 will have a varying phase orientation relative to the component waves of the beam 42. This varying phase orientation results in the formation of an interference pattern in the recombined beam 46, typically in the form of alternating, light and dark lines known in the art as interference lines or fringes. Referring to FIG. 3, a component of the recombined beam 46 derived from the reflected reference beam 42 may be illustrated by the phase orientation represented by the sinusoidal curve A. A corresponding component derived from the reflected beam 44 may be in phase with the component wave of A as represented by the sinusoidal curve B, may have a phase shift of 180° with respect to the component wave of A as represented by sinusoidal curve C, or may have any other phase shift orientation with respect to the component wave of A. In the case where the component waves are in phase as represented by the curves A and B, the waves constructively interfere to form a light interference line of larger amplitude, as represented by the sinusoidal curve D. In the case where the component waves are 180° out of phase, the waves destructively interfere to form a dark interference line of minimal amplitude, as represented by sinusoidal curve E. Since the component waves of the beams travel varying length pathways across the cross sections of the beams, the component waves of the recombined beam 46 will alternatingly vary from in phase to 180° out of phase across the cross section of the recombined beam, resulting in the alternating light and dark interference lines previously described.

As leakages occur either into or out of the storage vessel 10, the position of the reflecting portion 40 of the liquid surface is shifted relative to the position of the reference reflector 34, and the interference pattern at the detector 48 is altered by a shifting of the interference or fringe lines. The distance that the reflecting portion of the liquid surface is shifted relative to the reference reflector is proportional to the wavelength of the beams and the number of interference lines passing a particular point at the detector. The rate of change of the liquid surface level, i.e., the vessel leakage rate, is determined by counting the number of fringes passing a point at the detector for a period of time and then multiplying the number of fringes detected by one-half the wavelength of the beams. For example, the detection of 56 fringes per hour corresponds to a change of 28 wavelengths per hour in the relative position of the liquid surface level and the reference reflector. Where a laser emiting electromagnetic energy having a wavelength of 0.9 micrometers is employed, the rate of change is:

$$d = (56 \text{ fringes/hr.})(\tfrac{1}{2} \text{ wavelength/fringe}) \times$$
$$(0.9 \times 10^{-6} \text{m./wavelength})$$
$$= (28 \text{ wavelengths/hr.}) \times (0.9 \times 10^{-6} \text{m/wavelengths})$$
$$= 25.4 \times 10^{-6} \text{m./hr.}$$
$$= 0.001 \text{ inches/hr.}$$

where d is the rate of change in vertical position or level of the reflecting portion 40 of the liquid surface. The rate of change of the liquid level is then correlated with the vessel volume and geometry, and liquid content, to determine the rate of leakage of the vessel, which is preferably corrected for thermal expansion or contraction of the vessel liquid, as is hereinafter further described.

Referring again to FIG. 1, the apparatus of the invention further comprises a base adapted to rest on the bottom of the storage vessel 10 and support means, such as rod or tube 62, for supporting the interferometer apparatus 22 in the storage vessel a relatively short distance above the upper liquid surface 20. When used in connection with a steel storage vessel, the base is preferably formed of magnetic material to provide a reversibly fixed base support for the apparatus. The support rod or tube 62 is mounted on the base 60 by suitable means (not shown) and is adapted to extend from the base on the bottom of the storage vessel vertically upward through the fill tube 21, as shown in FIG. 1. Since the interferometer apparatus is supported on the support rod or tube 62, which extends into the liquid in the vessel, and the liquid surface to be measured is isolated from the support rod or tube, inaccuracies in the measurement process may result from thermal expansion or contraction of the rod or tube. For this reason, the rod or tube 62 is preferably formed from a material, such as Invar, having a relatively low coefficient of thermal expansion. Expansion or contraction of the rod or tube is additionally compensated for in determining leakage rates, as is hereinafter further described.

The interferometer apparatus 22 is mounted in a housing 64, which is also preferably formed from a material, such as Invar, having a relatively low coefficient of thermal expansion, and is adjustably supported on the rod or tube 62 by suitable brackets (not shown) in the storage vessel a relatively short distance above the liquid surface.

The fill tube 21 provides some measure of dampening of waves on the liquid surface in the vessel. However, in view of the high degree of resolution of the interferometer apparatus, it is necessary to further dampen surface wave motion prior to measuring leakage rates according to the invention. The apparatus of the invention therefore further comprises dampening means, such as relatively small diameter tube 66 for dampening surface waves in the reflecting portion 40 of the liquid surface. As shown in FIGS. 1 and 2, the dampening tube 66 is suitably mounted on the housing 64 and is adapted to extend below the liquid surface 20 at least about 3 inches, and preferably more. The dampening tube 66 is further adapted to contain a substantial portion of the third beam 32, as shown in FIG. 2, and is preferably provided with a closed bottom wall 63 and a small passageway 68 providing fluid communication with the vessel near the bottom of the tube to provide equalization of the level of the reflecting surface portion 40 in the tube 66 and the upper surface level 20 in the vessel. In this manner, the reflecting surface portion 40 of the liquid surface is defined by the tube 66 which essentially isolates the reflecting surface portion from wave motion in the remainder of the liquid. In some cases, the reflecting surface portion 40 of the liquid may be inadequate to reflect a sufficient amount of the beam 32 to permit measurement by the interferometer apparatus. In these cases, a reflector surface is suspended on the liquid surface in the tube 66 to reflect the beam 32. As shown in FIG. 2, the reflector surface in the tube 66 may comprise, for example, a float 65 having a reflector or mirror 67 fixed to the upper surface thereof. The float 65 is preferably designed and adapted to float freely on the surface portion 40 of the liquid in tube 66 in a manner which minimizes interaction with the tube's inner sidewall 69.

As further shown in FIGS. 1 and 2, the reference reflector 34 is preferably suspended from interferometer apparatus housing 64 by means of a tube 70, preferably corresponding in size, shape and material composition to tube 66, and preferably similarly adapted to extend beneath the surface of the liquid. The reference reflector 34 may be mounted directly on the tube 70. However, in order to avoid inaccuracy in measurements due to differences in the coefficients of thermal expansion of the tube material and the liquid, it is preferable to suspend the reference reflector surface 34 on the surface of a body of liquid contained in the tube 70 and in thermal equilibrium with, but isolated from, the liquid in the vessel. Thus, in a presently particularly preferred embodiment, the tube 70 is provided, with a bottom wall 71, the tube 70 is partially filled with liquid from the vessel and a float 73 having a reflector or mirror 75 on the upper surface thereof is suspended on the liquid in the tube. The float 73 is similarly designed and adapted so as to minimize interaction with the inside sidewall 77 of the tube 70 bearing the referencereflector 34. In this manner, the liquid contained in the submerged tube will remain at the temperature of the liquid in the vessel and thermal effects on the reference reflector surface in tube 70 will correspond to those on the liquid surface level to be measured in the tube 66.

In addition to effects of vessel leakage, the liquid surface level in the vessel is also subject to change caused by expansion or contraction of the liquid, the support rod or tube 62 and the tube 70 due to varying temperature conditions. To compensate for temperature related volume changes, the apparatus is further provided with a plurality of temperature sensors 80 spaced along the length of the support rod. Temperature readings are taken from the sensors and used to compile a temperature profile for the vessel liquid. Changes in the temperature profile during use of the interferometer apparatus are used to determine temperature related liquid volume changes and elongation or contraction of the measurement apparatus, which are then compensated for in calculating leakage losses from measurement of changes in the liquid surface level.

Referring again to FIGS. 1 and 2, the apparatus of the invention further comprises recording means, such as recorder 54, for recording information representative of the number of fringes counted by detector 48 over time. In a presently particulary preferred embodiment, the apparatus additionally comprises means, such as preprogramed microcomputer 56, for receiving a signal, such as through line 53, from detector 48 representative of the number of fringes detected by the detector over time and a signal from the temperature sensors 80, through operably connected transmission means (not shown), representative of the temperature of the liquid at various locations along the support rod or tube, and for processing the information contained in these signals in connection with known variables of the measurement process including laser beam wavelength, the coefficient of thermal expansion of the liquid in the vessel, the support rod or tube 62 and the tube 70, the vessel size and geometry and the approximate liquid level in the vessel, to compute the rate of leakage in the vessel. The microcomputer is adapted to emit a signal representative of the leakage rate which is received by the recorder 54, such as through line 55, where a record is made of the leakage rate. As shown in FIG. 1, the computer 56 and the recorder 54 may be conveniently located above the ground at a position remote from the interferometer apparatus in the vessel. The computer and recorder can be of any variety suitable for a particular measurement application. Many useful computers and recorders suitable for this purpose are well known in the art.

In operation of the apparatus as previously described, the support rod or tube 62 and base 60 are vertically lowered through the access opening 16 into the vessel 10 until the base 60 is placed into supporting engagement with the bottom of the vessel. The rod or tube may additionally be braced near the top of the fill tube 21, such as with adjustable spider 82, two legs of which are shown at 84, 86 in FIG. 1, or other suitable centering means, in order to maintain a vertical orientation of the rod or tube 62. The tube 70 is then partially filled with liquid from the vessel and the float 73 is suspended on the liquid surface of the tube 70. The interferometer apparatus is then lowered into the vessel and is fixed to the support rod or tube 62 so that the interferometer apparatus is located a relatively short distance above the liquid surface 20 in the vessel and the tubes 66, 70 extend beneath the liquid surface a distance of at least about 3 inches. After the support rod or tube 62, the tubes 66 and 70, and the liquid in the tubes 66, 70 have reached thermal equilibrium with the liquid in the vessel, tupically after a period of time on the order of about 15 minutes, measurement of the vessel leakage rate is conducted as previously described.

While the apparatus has been described in connection with presently preferred, illustrative embodiments, various modifications may be apparent from the foregoing disclosure. Any such modifications are intended to be within the scope of the appended claims except insofar as precluded by the prior art.

What is claimed is:

1. An interferometer apparatus for detecting and measuring the rate of leakage in a liquid storage vessel having liquid contained therein, said interferometer apparatus comprising:
   a housing,
   means for supporting said housing a predetermined distance above the surface of said liquid in the interior of said vessel,
   means in said housing for supplying a first laser beam,
   means in said housing for splitting said first laser beam into second and third laser beams,
   a first hollow tube downwardly extending from said housing and into said liquid, said first tube having means near its bottom for permitting fluid communication between said liquid and the interior of said first tube, said first tube having its hollow interior opening into said interior of said housing,
   means in said first tube having an upper reflective surface for floating on the surface of the liquid contained in said first tube,
   a second hollow tube downwardly extending from said housing and into said liquid, said second tube being sealed from said liquid and the aforesaid tube containing a predetermined amount of fluid, said second tube having its hollow interior opening into the interior of said housing,
   means in said second tube having an upper reflective surface for floating on the surface of the fluid contained in said second tube,
   means in said housing for directing said second laser beam onto the reflective surface of said floating means in said second tube and for directing said third laser beam onto the reflective surface of said floating means in said first tube, said directing means being further capable of combining the beams reflected from the two aforesaid reflecting surfaces into a fourth laser beam,
   means in said housing receptive of said fourth laser beam for detecting changes in a fringe pattern of the fourth laser beam and for generating a signal representative thereof, said changes being proportional to any leakage into or out of said vessel.

2. The apparatus of claim 1 wherein said supporting means comprises a base adapted to rest on the bottom of the storage vessel and a support mounted on the base for holding the housing in the storage vessel above the liquid surface.

3. The apparatus of claim 2 wherein the support comprises a rod having a relatively low coefficient of linear thermal expansion.

4. The apparatus of claim 2 which further comprises sensing means for sensing the temperature of the liquid at spaced locations in the vessel.

5. The apparatus of claim 4 wherein the sensing means comprises a plurality of temperature sensors located at spaced positions along the support for sensing the temperature of the liquid in the vessel and for generating a signal representative thereof.

6. The apparatus of claim 5 which further comprises computer means adapted to receive the signal representative of changes in the fringe pattern of the fourth beam and the signals representative of the temperature of the liquid in the vessel for computing the rate of leakage of liquid in the vessel and for generating a signal representative thereof, and wherein the recording means is further adapted to receive and record the signal generated by the computer means representative of the rate of leakage in the vessel.

7. The apparatus of claim 1 wherein said first tube further comprises dampening means for dampening any wave motion in the liquid surface in said first tube.

8. The apparatus of claim 7 wherein the dampening means in the first tube further comprises an enclosed bottom wall and a formed passageway extending through the tube adapted to provide said fluid communications between the tube and the vessel.

9. The apparatus of claim 1 wherein the fluid in the second tube has a coefficient of thermal expansion substantially equal to that of said liquid in said vessel.

10. An interferometer apparatus for detecting and measuring the rate of leakage in a liquid storage vessel having liquid contained therein, said interferometer apparatus comprising:
    a housing,
    means for supporting said housing a predetermined distance above the surface of said liquid in the interior of said vessel,
    means in said housing for supplying a first laser beam,
    means in said housing for splitting said first laser beam into second and third laser beams,
    a first hollow tube downwardly extending from said housing and into said liquid, said first tube having means near its bottom for permitting fluid communication between said liquid and the interior of said first tube, said first tube having its hollow interior opening into said interior of said housing, a second hollow tube downwardly extending from said housing and into said liquid, said second tube being sealed from said liquid and the aforesaid tube containing a predetermined amount of fluid, said second tube having its hollow interior opening into the interior of said housing.

means in said housing for directing said second laser beam onto a reflecting portion of said fluid in said second tube and for directing said third laser beam onto a reflecting portion of said liquid in said first tube, said combining means being further capable of directing the beams reflected from the aforesaid two reflecting surfaces into a fourth laser beam, means in said housing receptive of said fourth laser beam for detecting changes in a fringe pattern of the fourth beam and for generating a signal representative thereof, said changes being proportional to any leakage into or out of said vessel.

* * * * *